United States Patent [19]

Cummings et al.

[11] Patent Number: 5,250,307

[45] Date of Patent: Oct. 5, 1993

[54] PRODUCTION OF FEED SUPPLEMENT COMPOSITIONS

[75] Inventors: Kenneth R. Cummings, Skillman, N.J.; Thomas F. Sweeney, Morrisville, Pa.; M. Stephen Lajoie, Basking Ridge; Alfredo Vinci, Dayton, both of N.J.

[73] Assignee: Church & Dwight Co., Inc., Princeton, N.J.

[21] Appl. No.: 802,263

[22] Filed: Dec. 4, 1991

[51] Int. Cl.$^5$ .............................................. A23K 1/00
[52] U.S. Cl. ........................................ 426/72; 426/74; 426/583; 426/601; 426/656; 426/648; 426/658; 426/807; 424/438
[58] Field of Search ................... 426/583, 72, 74, 623, 426/630, 601, 658, 656, 807, 648, 658; 424/438

[56] References Cited

U.S. PATENT DOCUMENTS 4,729,896  3/1988  Sawhill ............................. 426/623
4,826,694  5/1989  McAskie ............................. 426/74

OTHER PUBLICATIONS

Hawley "The Condensed Chemical Dictionary" 10th Edition Van Nostrand Reinhold Publishers 1982 p. 947.

Primary Examiner—R. B. Penland
Attorney, Agent, or Firm—Charles B. Barris

[57] ABSTRACT

In one embodiment this invention provides a process for preparing a dietary fatty acid salt supplement composition which contains a combination of additional nutrient or medicament ingredients.

The dietary composition can function as a rumen bypass animal feed supplement, and permit a beneficial increase in the nutrient fat content of the feed.

19 Claims, No Drawings

PRODUCTION OF FEED SUPPLEMENT COMPOSITIONS

CROSS-REFERENCE TO RELATED APPLICATION

The subject matter of the present patent application is related to that disclosed in patent application Ser. No. 761,235, filed Sep. 17, 1991.

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is a concentrated energy source, and it is known that if the proportion of fat in cattle feed is increased, lactating dairy cattle produce high milk yields without draining their reserves of body fat and without diminishing the proportion of milk fat in the milk produced.

However, it has been found that if the proportion of fat in the diet of cattle exceeds about 5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, the total energy derived is less than that resulting from more complete miocrobial digestion in the rumen.

There has been a continuing need for new dietary supplements for animal feed which can be fed to ruminant animals without interfering with the rumen microorganisms, or being rendered ineffective by the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen inert product which passes through the rumen without interfering with rumen fermentation (i.e., a rumen bypass product), and is subsequently metabolized in the abomasum or small intestine of the ruminant.

Accordingly, it is an object of this invention to provide a fatty acid salt composition which can function as a rumen bypass animal feed supplement, and permit a beneficial increase in the dietary fat content of the feed.

It is another object of this invention to provide a process for production of a fatty acid salt dietary supplement composition which contains one or more additional biologically active nutrient or medicament ingredients which have rumen bypass protection.

Other objects and advantages of the present invention shall become apparent from the accompanying description and examples.

DESCRIPTION OF THE INVENTION

One or more objects of the present invention are accomplished by the provision of a process for the preparation of a dietary fatty acid salt product which comprises (1) forming an admixture of reactive ingredients comprising [A] at least one $C_{14}$-$C_{22}$ fatty acid, [B] between about 0.8-1.5 equivalents of basic alkaline earth metal compound per equivalent of $C_{14}$-$C_{22}$ fatty acid, [C] between about 0.0-0.4 equivalent of basic alkali metal compound per equivalent of $C_{18}$-$C_{22}$ fatty acid, and [D] between about 10-50 weight percent of an aqueous suspension medium containing constituents comprising (a) $C_{14}$-$C_{22}$ fatty acid alkali metal or ammonium salt, and (b) a biologically active ingredient; and (2) recovering the dietary product after completion of the salt-forming reaction.

In a preferred embodiment of this invention process the aqueous suspension medium is an undiluted or water-diluted form of a concentrated liquid nutrient formulation which prior to incorporation in the process reaction medium is an aqueous suspension mixture containing constituents comprising:

(a) $C_{14}$-$C_{22}$ fatty acid alkali metal or ammonium salt; and (b) a biologically active ingredient;

and the concentrated liquid nutrient formulation has a pH in the range between about 4-12, and a viscosity in the range between about 5-5000 cps at 25° C.

The $C_{14}$-$C_{22}$ fatty acid component of the salt-forming reaction medium consists of one or more saturated or unsaturated carboxylic acids such as those derived from beef and mutton tallow, lard, cottonseed oil, palm oil, and the like.

Palm fatty acid distillate is a commercial product produced by distilling the fatty acids present in natural palm oil. A distillate product typically has the following weight percent content:

| | |
|---|---|
| Free fatty acids | 60–90 |
| Water | <1 |
| Triglycerides | 10–40 |
| Unsaponifiables | <3 |

The iodine value is less than 54 and the melting point is about 45° C. The content of peroxides is below 10 milliequivalents of oxygen per kilogram. The fatty acids in the free fatty acids and the triglycerides consist of the following weight percent:

| | |
|---|---|
| Palmitic acid | 38–50 |
| Oleic acid | 35–40 |
| Linoleic acid | 5–10 |
| Stearic acid | 3–6 |
| Lauric acid | 1–3 |

Beef tallow acids are available commercially as a byproduct obtained by alkaline extraction of waste beef fat and subsequent acidification, and normally contain the following weight percent of fatty constituents:

| | |
|---|---|
| Free fatty acids | 60–90 |
| Triglycerides | 10–40 |
| Water | <1 |
| Unsaponifiables | <3 |

The iodine value is less than 50 and the melting point is 40°–45° C. The content of peroxides is less than 10 milliequivalents of oxygen per kilogram. The fatty acids in the free fatty acids and in the triglycerides have the following weight percent content:

| | |
|---|---|
| Palmitic acid | 22–28 |
| Oleic acid | 38–44 |
| Linoleic acid | 3–6 |
| Stearic acid | 18–24 |

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03–0.1% or higher of antioxidant as permitted by regulation, and about 0.05–0.3% of chelating agent, based on the weight of fatty acid.

Illustrative of preferred additives are butylated hydroxytoluene antioxidant, and citric acid and ethylenediamine tetraacetate chelating agents. The chelating agent is added in an edible solvent such as propylene glycol to facilitate blending into the fatty acid.

The alkaline earth metal ingredient of the process is at least one member selected from the group consisting of basic calcium and magnesium compounds, such as oxides, carbonates, phosphates, hydroxides, and the like. The alkaline earth metal component preferably has a particle size which passes a 100 mesh U. S. standard screen.

The optional basic alkali metal compound ingredient is at least one member selected from the group consisting of basic sodium and potassium and lithium oxides, carbonates, bicarbonates, phosphates, hydroxides, and the like.

The content of water-insoluble ingredients which are suspended in an invention aqueous phase usually will be in the range of 10–40 weight percent of the aqueous suspension medium. The particle size of the suspended phase generally will range from colloidal to a particle size of solid which passes through a 100 mesh U.S. standard screen.

The content of ingredients in an aqueous suspension medium typically will conform to the following proportions:

| Ingredient | Weight Percent |
|---|---|
| Fatty acid salt | 2–30 |
| Biologically active constituent | 0.5–20 |
| Carbohydrate | 0–30 |
| Suspension stabilizing agent | 0–2 |
| Antioxidant | 0–0.5 |
| Preservative | 0–1 |
| Other optional constituents | 0–20 |

The fatty acid salt ingredient is selected from $C_{14}$–$C_{22}$ fatty acid salts of alkali metal and ammonium ions. The alkali metal ions are illustrated by sodium, potassium and lithium, and the ammonium ions are illustrated by the $H \oplus NR^3$ structure, where R is hydrogen or a $C_1$–$C_4$ alkyl substituent.

Suitable $C_{14}$–$C_{22}$ fatty acids include myristic, palmitic, stearic, arachidic, behenic, oleic, ricinoleic, linoleic, linolenic, gadoleic, and the like, singly or in any combination. The unsaturated fatty acids typically are mixtures of cis and Trans isomers.

The biologically active constituent utilized in the invention process can be selected from a broad variety of nutrients and medicaments, either as a single component or as a mixture of components, which are illustrated by the following listing of active molecular species:

1. $C_2$–$C_{22}$ aliphatic carboxylic acids and esters, and alkali metal, ammonium and alkaline earth metal salts which are different than the primary fatty acid salt ingredient present in the process reaction medium.

2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| Protein | 12.0% |
| Fat | 0.7% |
| Lactose | 60.0% |
| Phosphorus | 0.79% |
| Calcium | 0.87% |
| Ash | 9.7% |

Another source of carbohydrate is derived from the pulp and paper industry which produces large quantities of byproduct lignin sulfonates from wood during the sulfite pulping process. The byproduct is recovered in the form of salts such as ammonium, sodium and magnesium lignin sulfonates.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs thereof.

4. vitamin ingredients either singly or in combination which include thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

5. protein ingredients as obtained from sources such as dried blood or meat meal, cottonseed meal, soy meal, dehydrated alfalfa, dried and sterilized animal and poultry manure, fish meal, liquid or powdered egg, fish solubles, cell cream, rape seed oil (canola oil), and the like.

Protein equivalent ingredients include non-protein nitrogen compounds such as urea, biuret, ammonium phosphate, and the like.

6. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

7. enzymes such as lipolytic proteins which aid feed digestibility, e.g., by hydrolysis of fatty acid glycerides to free fatty acid and glycerol.

8. antioxidants as illustrated by butylated hydroxyanisole, butylated hydroxytoluene, tertiary-butylhydroquinone, propyl gallate, and ethoxyquin; and suitable preservatives include sodium sorbate, potassium sorbate, sodium benzoate, propionic acid, α-hydroxybutyric acid, and the like.

9. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

The biologically active ingredient is present in a quantity between about 0.5–20 weight percent of the aqueous suspension medium in the invention process.

The invention process can be conducted in a batch reactor or as a continuous operation. The fatty acid, alkaline earth metal compound and aqueous suspension medium can be admixed simultaneously, or the fatty acid and alkaline earth metal compound can be blended first and then combined with the aqueous suspension medium.

In one method the fatty acid is heated to 80°–110° C., and then mixed with the alkaline earth metal compound. After the aqueous suspension medium is added to the mixture, there is a short induction period which is followed by an exothermic salt-forming reaction.

The amount of aqueous suspension medium employed is sufficient to supply the water required to hydrate the basic alkali earth metal compound and support the salt-forming reaction, and preferably the water then is vaporized as steam during the exothermic reaction period to yield a friable fatty acid salt product which in granule form is suitable for use as an animal feed supplement.

A present invention dietary fatty acid salt composition is adapted to function as a rumen bypass dietary supplement in ruminant feed. An important advantage of a present invention dietary supplement composition is the rumen bypass protection which extends to all the biologically active ingredients of the composition, such as aminoacids, vitamins, and the like, which normally are metabolized in the rumen.

The following examples are further illustrative of the present invention. The components and specific ingredients are presented as being typical, and various modifications can be derived in view of the foregoing disclosure within the scope of the invention.

EXAMPLE I

This Example illustrates the continuous production of a dietary fatty acid calcium salt product in accordance with the present invention.

The fatty acid component is a palm fatty acid distillate of the following composition:

| Lauric acid | 2.3% |
| Palmitic acid | 49.9% |
| Stearic acid | 5.4% |
| Oleic acid | 35.0% |
| Linoleic acid | 7.4% |

The process is operated continuously with equipment which is essentially the same as described and illustrated with reference to FIG. 1 of U.S. Pat. No. 4,826,694 by W. McAskie.

Calcium oxide from a hopper and hot palm oil distillate (96° C.) from a supply line are mixed in predetermined proportions (1.2 CaO:1.0 oil equivalents) in a mixing pump. The aqueous suspension medium is added to the reactant admixture via a supply line.

The aqueous suspension medium has the following weight ratio of constituents:

The residence time on the first conveyor is about 30 minutes, and the overall production time from reactant mixing to collection of the dry granulated product is about 2.5 hours.

The final product has a total fatty acid calcium salt content of 85 weight percent, a fatty acid potassium salt content of 0.093 weight percent, a methionine hydroxy analog content of 0.031 weight percent, a water content of about 3–5 weight percent, and an ash content of about 15 weight percent.

The invention fatty acid calcium salt product can be incorporated as a dietary supplement in cattle feed such as hay silage or corn silage, in a calculated quantity which will provide each animal about 200 grams per day of fatty acid salt, and about 2 grams per day of methionine hydroxy analog.

The process is repeated, except that the aqueous suspension medium has the following weight ratio of constituents:

| Sodium oleate | 15.0 |
| Sodium stearate | 15.0 |
| Methionine hydroxy analog | 10.0 |
| Guar gum | 0.2 |
| Water | 100.0 |
| Potassium oleate | 15 |
| Potassium stearate | 15 |
| Palmitic acid | 10 |
| Methionine hydroxy analog | 10 |
| Water | 100 |

The aqueous suspension medium is supplied in a quantity which provides about 0.045 weight percent of methionine hydroxy analog, based on the weight of palm fatty acid distillate utilized in the salt-forming process.

The hydrated mixture formed in the process is passed through a mixing pump and the resultant semi-liquid reaction medium at about 100° C. is discharged as a spread layer onto a continuously moving conveyor belt. Steam evolves from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt product is passed through a sifter, and collected in bags suitable for transportation and storage.

The process is repeated, except that the aqueous suspension medium has the following weight ratio of constituents:

| | |
|---|---|
| Sodium oleate | 15 |
| Sodium palmitate | 15 |
| Methionine hydroxy analog | 10 |
| Sucrose | 2 |
| Water | 100 |

The process is repeated except that the aqueous suspension has the following weight ratio of ingredients:

| | |
|---|---|
| Sodium oleate | 15.0 |
| Sodium linoleate | 15.0 |
| Methionine hydroxy analog | 10.0 |
| Whey solids | 2.0 |
| Polyethylene glycol (400) monooleate | 0.2 |
| Water | 100.0 |

EXAMPLE II

This Example illustrates the preparation of a dietary fatty acid calcium salt product which contains vitamin A and trace minerals.

Calcium oxide (100 g) and palm fatty acid distillate (700 g) are admixed, and then the mixture is blended with a liquid nutrient formulation (300 g) with stirring. Steam evolves during the exothermic salt-forming reaction, and the final product is in the form of a friable solid.

The liquid nutrient formulation starting material employed in the process is prepared with the following ingredients:

| | |
|---|---|
| Potassium linoleate | 200 g |
| Soy bean meal | 300 g |
| Soy lecithin | 10 g |
| Tricalcium phosphate | 5 g |
| Trace minerals[1] | 2 g |
| Vitamin A | 1 g |
| Xanthan gum (Kelco) | 3 g |

The listed ingredients, except for the xanthan gum, are blended to form a homogeneous dry mixture. The xanthan gum is added to 1200 milliliters of water, and then the dry mixture is added to the water medium with high speed stirring to form a stable suspension.

| | Weight Ratio |
|---|---|
| [1]$CoSO_4 \cdot 7H_2O$ | 4 |
| $CuSO_4 \cdot 5H_2O$ | 5 |
| $MnSO_4 \cdot H_2O$ | 6 |
| $FeSO_4 \cdot 7H_2O$ | 7 |
| $ZnSO_4 \cdot H_2O$ | 3 |

EXAMPLE III

This Example illustrates the preparation of a dietary fatty acid calcium salt product which contains water-soluble carbohydrate and a non-protein nitrogen ingredient.

Calcium oxide (200 g) and palm fatty acid distillate (1400 g) are admixed, and then the mixture is blended with a liquid nutrient formulation (600 g). Steam evolves during the exothermic salt-forming reaction, and the final product is in the form of a friable solid.

The liquid nutrient formulation starting material employed in the process is prepared with the following ingredients:

| | |
|---|---|
| Palm oil distillate sodium salt[1] | 200 g |
| 79.5% Brix cane molasses | 300 g |
| 50% Urea solution | 50 g |
| Magnesium oxide (200 mesh) | 20 g |
| Xanthan gum | 2 g |
| Propionic acid | 2 g |
| Butylated hydroxytoluene | 0.5 g |

[1]Sodium salt of Example I type of fatty acid composition.

The xanthan gum is hydrated in one liter of water, and the magnesium oxide is slurried in the aqueous medium with stirring. The molasses, urea and palm oil distillate then are added in succession with high speed stirring to form a stable suspension.

What is claimed is:

1. A process for the preparation of a dietary fatty acid salt product which comprises (1) forming an admixture of reactive ingredients consisting essentially of (A) at least one $C_{14}$–$C_{22}$ fatty acid, (B) between about 0.8–1.5 equivalents of basic alkaline earth metal compound per equivalent of $C_{14}$–$C_{22}$ fatty acid, (C) between about 0.0–0.4 equivalent of basic alkali metal compound per equivalent of $C_{14}$–$C_{22}$ fatty acid, and (D) between about 10–50 weight percent of an aqueous suspension medium, based on the weight of (A) $C_{14}$–$C_{22}$ fatty acid, containing constituents consisting essentially of (a) between about 2–30 weight percent of $C_{14}$–$C_{22}$ fatty acid alkali metal or ammonium salt, wherein said aqueous suspension medium provides alkali metal or ammonium cations for the formation of $C_{14}$–$C_{22}$ fatty acid alkali metal or ammonium salt intermediates, and (b) between about 0.5–20 weight percent of a biologically active constituent, based on the weight of aqueous suspension medium; and (2) recovering the dietary salt product after completion of the salt-forming reaction, and wherein said dietary salt product functions as a rumen bypass animal feed supplement.

2. A process in accordance with claim 1 wherein the $C_{14}$–$C_{22}$ fatty acid and alkaline earth metal compound are premixed before admixture with the other process ingredients.

3. A process in accordance with claim 1 wherein the fatty acid ingredient is a mixture comprising 0–10 percent lauric acid, 0–60 percent palmitic acid, 0–10 percent stearic acid, 0–60 percent oleic acid, and 0–10 percent linoleic acid.

4. A process in accordance with claim 1 wherein the alkaline earth metal ingredient is a basic calcium compound or magnesium compound or a mixture thereof.

5. A process in accordance with claim 1 wherein the $C_{14}$–$C_{22}$ fatty acid metal or ammonium salt ingredient has alkali metal ions selected from sodium, potassium and lithium, or ammonium ions corresponding to the formula $H^{\oplus}NR^3$, where R is hydrogen or a $C_1$–$C_4$ alkyl substituent.

6. A process in accordance with claim 1 wherein the aqueous suspension medium is a water-diluted form of a concentrated liquid nutrient formulation which prior to dilution is an aqueous suspension mixture containing constituents comprising:

(a) $C_{14}$–$C_{22}$ fatty acid alkali metal or ammonium salt; and (b) a biologically active ingredient;

and the concentrated liquid nutrient formulation has a pH in the range between about 4–12, and a viscosity in the range between about 5–5000 cps at 25° C.

7. A process in accordance with claim 1 wherein the biologically active constituent is a nutrient.

8. A process in accordance with claim 1 wherein the biologically active constituent is a medicament.

9. A process in accordance with claim 1 wherein the biologically active constituent comprises at least one aminoacid.

10. A process in accordance with claim 1 wherein the biologically active constituent comprises at least one polypeptide.

11. A process in accordance with claim 1 wherein the biologically active constituent comprises at least one antibiotic.

12. A process in accordance with claim 1 wherein the biologically active constituent comprises at least one vitamin or nutrient trace element.

13. A process in accordance with claim 1 wherein the aqueous suspension medium contains a suspension stabilizing agent.

14. A process in accordance with claim 13 wherein the suspension stabilizing agent is a nonionic surfactant.

15. A process in accordance with claim 13 wherein the suspension stabilizing agent is a hydrocolloid.

16. A process in accordance with claim 13 wherein the suspension stabilizing agent is a cellulose ether.

17. A process in accordance with claim 1 wherein the aqueous suspension medium contains a polysaccharide.

18. A process in accordance with claim 1 wherein the aqueous suspension medium contains a water-soluble carbohydrate.

19. A process in accordance with claim 18 wherein the carbohydrate is a molasses or whey mixture.

* * * * *